(12) United States Patent
Rigobert

(10) Patent No.: US 8,338,010 B2
(45) Date of Patent: Dec. 25, 2012

(54) SAFETY DEVICE FOR A SEALED ACCUMULATOR

(75) Inventor: Gerard Rigobert, Fargues St Hilaire (FR)

(73) Assignee: SAFT, Bagnolet (FR)

( * ) Notice: Subject to any disclaimer, the term of this patent is extended or adjusted under 35 U.S.C. 154(b) by 567 days.

(21) Appl. No.: 12/519,455

(22) PCT Filed: Dec. 18, 2007

(86) PCT No.: PCT/FR2007/002097
§ 371 (c)(1),
(2), (4) Date: Jun. 16, 2009

(87) PCT Pub. No.: WO2008/093007
PCT Pub. Date: Aug. 7, 2008

(65) Prior Publication Data
US 2010/0035129 A1 Feb. 11, 2010

(30) Foreign Application Priority Data
Dec. 22, 2006 (FR) ...................................... 06 11251

(51) Int. Cl.
*H01M 2/12* (2006.01)
(52) U.S. Cl. .................. 429/56; 429/7; 429/53; 429/61; 429/211

(58) Field of Classification Search .................. None
See application file for complete search history.

(56) References Cited

U.S. PATENT DOCUMENTS

| 5,523,178 A | 6/1996 | Murakami et al. | |
|---|---|---|---|
| 6,033,795 A * | 3/2000 | Broussely et al. | 429/56 |
| 6,248,470 B1 | 6/2001 | Azema et al. | |
| 6,413,679 B1 * | 7/2002 | Kuboki et al. | 429/347 |
| 2006/0019150 A1 * | 1/2006 | Rigobert et al. | 429/56 |
| 2006/0199046 A1 | 9/2006 | Dewulf et al. | |

FOREIGN PATENT DOCUMENTS

| EP | 1 626 456 A2 | 2/2006 |
|---|---|---|
| FR | 2 881 580 A1 | 8/2006 |
| WO | 2004/049494 A1 | 6/2004 |

* cited by examiner

*Primary Examiner* — John S Maples
(74) *Attorney, Agent, or Firm* — Sughrue Mion, PLLC

(57) ABSTRACT

The invention relates to a safety device for a watertight electro-chemical accumulator (1), comprising a circuit breaker (13) which is actuated by an overpressure inside a container (2) of the accumulator, and a gas generator (20) which is activated when the temperature in the generator exceeds a predetermined threshold value. The safety device can be used for quickly interrupting the current flow through the accumulator in case of malfunction and before electrolyte vapors are generated.

10 Claims, 1 Drawing Sheet

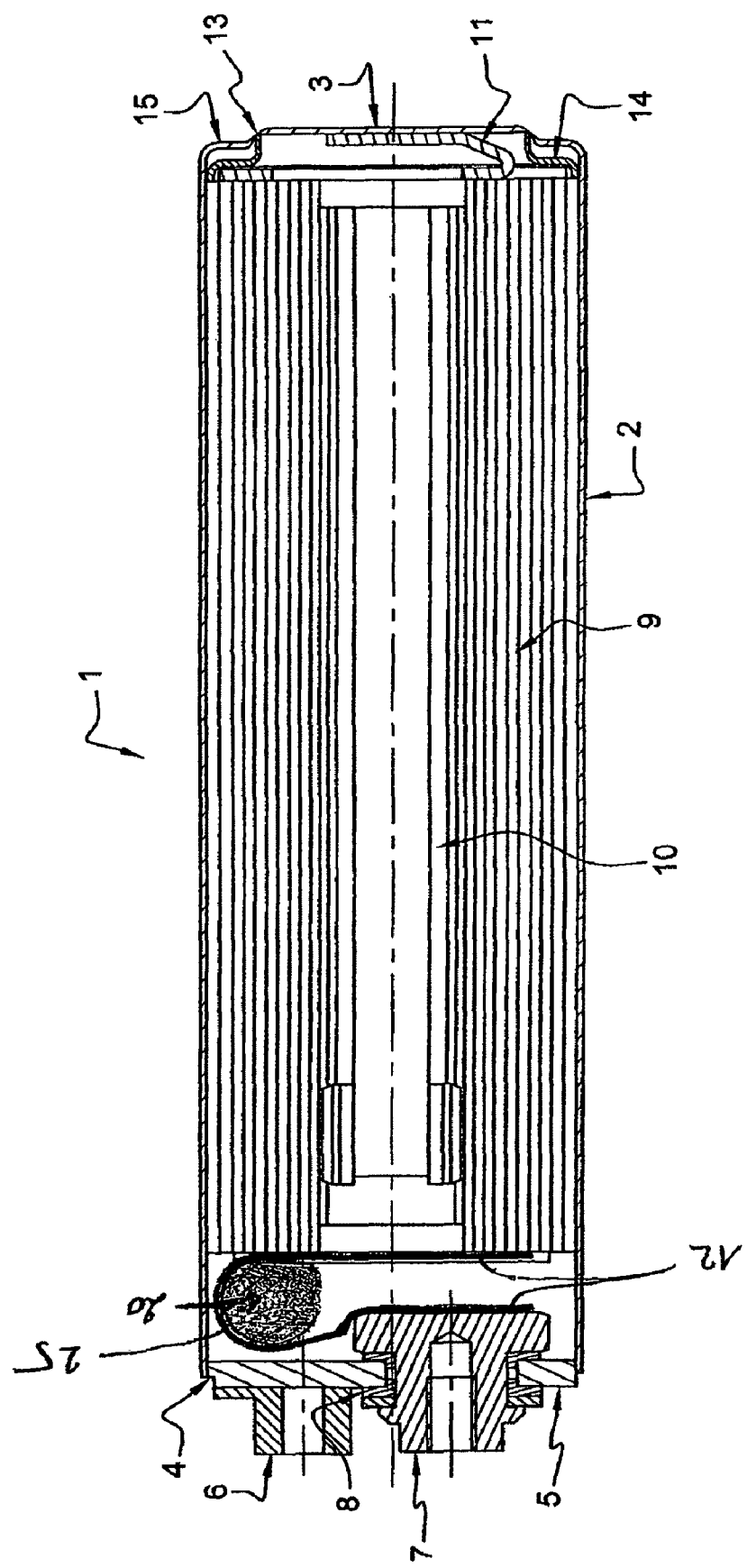

SAFETY DEVICE FOR A SEALED ACCUMULATOR

CROSS REFERENCE TO RELATED APPLICATION

This application is a National Stage of International Application No. PCT/FR2007/002097 filed Dec. 18, 2007, claiming priority based on French Patent Application No. 0611251, filed Dec. 22, 2006, the contents of all of which are incorporated herein by reference in their entirety.

The present invention relates to a safety device for a sealed accumulator.

A sealed accumulator or sealed electrochemical generator (these two terms being equivalent, the term accumulator will be used in the present description) comprises in a fashion known per se an electrochemical bundle comprising alternating positive and negative electrodes on either side of separators impregnated with electrolyte; this electrochemical bundle constitutes the core of the accumulator. Each electrode is composed of a metallic current collector supporting on at least one of its faces the electrochemically active material. The electrode is electrically connected to a current output which ensures electrical continuity between the electrode and the external application with which the accumulator is associated. The bundle of electrodes is arranged in a container which is closed in a sealed manner by a cover.

The invention relates to any type of sealed accumulator, in particular the accumulators of nickel-cadmium, nickel-metal hydride and lithium-ion type. These accumulators can be of cylindrical format or rectangular format (also known by the term prismatic).

An accumulator is generally designed to operate under so-called nominal conditions, i.e. within given temperature, current and voltage ranges. The use of a sealed accumulator outside the nominal conditions, such as for example an accidental overload, a short circuit, a temperature greater than the maximum operating temperature etc., creates the risk of an explosion. In fact, such situations lead to heating of the electrolyte and the formation of electrolyte vapours. The accumulation of these vapours in the container leads to an increase in the internal pressure of the accumulator, which can lead to a violent bursting of the container and to the release of chemical compounds which are harmful and corrosive to the environment and by-standers.

Safety devices exist, which prevent the accumulation of gas inside the container of a sealed accumulator and allow their evacuation when the internal pressure exceeds a predetermined value.

The document U.S. Pat. No. 5,523,178 describes a safety device constituted by a valve. This valve however has the drawback of having a complex design. When their design is simple, valves have the disadvantage of opening only for high pressures or opening only over a narrow pressure range. Moreover, such valve devices require coupling to a circuit breaker capable of electrically and irreversibly isolating the apparatuses connected to the accumulator.

The document EP-A-1 626 456 describes a safety device for a sealed accumulator which combines the functions of valve and circuit breaker. A thinning is provided in an end wall of the container, this thinning being capable of being torn under the effect of excess pressure in the container. When the thinning tears, the electrical conduction between the electrodes of one polarity and the corresponding current output terminal is interrupted. The device of the document EP-A-1 626 456 is satisfactory; nevertheless, the tearing of the thinning occurs only when the pressure in the accumulator reaches a high level, of the order of 8 to 12 bar. Such an excess pressure in the accumulator is generally caused by a strong accumulation of electrolyte vapours formed during runaway of the core.

The document WO-A-2004/049494 describes a battery containing an explosive agent which generates a gas starting from a predetermined temperature. The explosive agent can be dispersed in the active material of one of the electrodes or can be enclosed in a layer interposed between the active material of the electrode and the current collector. The gas generated by the explosive agent is capable of attacking the electrode which results in an increase in the impedance of the cell; the discharge current is thus limited. This document does not describe a circuit breaker but a deactivation of the cell by a corrosive gas released during overheating of the cell.

In a manner known per se, during a short circuit at the terminals of a lithium-ion type accumulator, a high current of approximately 2500 A is generated for approximately 1 second followed by a current of approximately 600 A for 50 seconds. When such currents pass through the accumulator for 50 seconds to 1 minute, there is heating then runaway of the core of the accumulator. This runaway causes an excess pressure which triggers the safety valve of a device as described in U.S. Pat. No. 5,523,178 or which causes the tearing of the thinning described in EP-A-1 626 456. It is however sought to prevent such a runaway of the core which leads to a violent reaction and to the emanation of electrolyte vapours which are harmful to the environment.

A need exists for a safety device which makes it possible to rapidly interrupt the passage of the current through the accumulator before there is runaway of the core; in particular for a safety device which allows opening of the circuit before the electrolyte vapours have been able to form in large quantities.

To this end, the invention proposes artificially raising the pressure inside the container of the accumulator in order to actuate the circuit breaker once the temperature rises above a threshold and therefore before there is runaway of the core of the accumulator.

The invention relates more particularly to a safety device for a sealed electrochemical accumulator comprising:
  a circuit breaker actuated by an excess pressure inside a container of the accumulator; and
  a gas generator activated when the temperature in the generator exceeds a predetermined threshold value.

According to an embodiment, a predefined quantity of gas is released by the gas generator when the temperature in the generator exceeds the predetermined threshold value for a duration greater than a predetermined threshold value.

According to the implementation methods the temperature threshold value is comprised between 130° C. and 150° C. and the duration threshold value is comprised between 10 and 20 seconds.

According to an embodiment, the gas generator before activation is a sealed capsule which contains a reactive powder.

According to an embodiment, the circuit breaker is constituted by a thinning provided on a wall of the container of the accumulator, said thinning being capable of being torn by an excess pressure inside the container.

According to an embodiment, the activation of the gas generator leads to a pressure inside the container greater than or equal to 8 bar.

According to an embodiment, the gas generator is of cylindrical format.

The invention also relates to a sealed accumulator comprising:

a container receiving alternating positive and negative electrodes respectively connected to positive and negative current output terminals, and a safety device according to the invention arranged in the container.

According to an embodiment, the accumulator comprises a thermally conductive element connecting the gas generator to the negative current terminal of the accumulator.

According to an embodiment, the thermally conductive element is constituted by a flat connection linking the negative electrode of the electrochemical bundle of the accumulator to the negative current output terminal.

Other characteristics and advantages of the invention will become apparent on reading the following description, given by way of example and with reference to the attached FIGURE which shows a longitudinal cross-section of a seated accumulator equipped with a safety device according to the invention. The invention relates to a safety device for a sealed accumulator. The device comprises a circuit breaker actuated by an excess pressure inside the container of the accumulator and a gas generator activated when the temperature in the container exceeds a predetermined threshold value.

Thus in the case of a malfunction of the accumulator such as a short circuit, the gas generator is actuated and releases a given volume of gas which increases the pressure inside the accumulator and causes the actuation of the circuit breaker. The circuit breaker is thus actuated before electrolyte vapours have been able to form due to runaway of the core.

The invention will be described in a preferred embodiment given by way of example.

The FIGURE shows in longitudinal cross-section a sealed accumulator of lithium-ion type and of cylindrical format equipped with the safety device according to the invention. It is understood that the invention can be applied to any other type and format of sealed etectrochemical accumulator.

The accumulator 1 comprises a container having a cylindrical wall 2 closed by a base 3 at one end and open at the other end 4. A cover 5 is placed over the open end. The cover supports current output terminals 6 and 7. One of the current output terminals, in the example the positive terminal 6, is welded onto the cover. The other current output terminal, in the example the negative terminal 7, passes through the cover. It is fixed to the latter by any means such as screwing or crimping. A seal 8 electrically isolates the negative current output terminal 7 from the cover.

An electrochemical bundle 9, constituted by a winding of positive and negative electrodes and a separator, is arranged in the container around a hollow shaft 10 which serves as a gas vent. A flat connection 11 connects the positive electrode of the bundle to the wall of the base 3 of the container 2, the walls of the container being electrically conductive with the cover. Another flat connection 12 connects the negative electrode of the bundle to the negative current output terminal 7. A ring seal 14 is placed between the electrochemical bundle and the base of the container. It serves as an electrical insulator in order to prevent electrical contact between the negative electrode section of the bundle and the wall of the container connected to the positive terminal, which could cause a short circuit.

The accumulator comprises a safety device comprising a gas generator 20 and a circuit breaker 13 capable of interrupting the electrical conduction between the electrodes of one polarity and the corresponding current output terminal.

According to the embodiment illustrated, the base 3 of the container has a thinning 13 which is capable of being torn by an excess pressure inside the container. An embodiment of such a circuit breaker is described in detail in the abovementioned document EP-A-1 626 456.

According to an embodiment, the gas generator 20 contains a reactive powder; it is capable of producing a volume of gas comprised between 200 $cm^3$ and 400 $cm^3$ below 20 bar when the powder is taken to a temperature greater than a predetermined threshold value. For example, the gas generator 20 can comprise 0.8 grams of PROPERGOL type material which reacts at approximately 140° C. It is however possible to use other reactive powders or mixtures provided that their ignition temperature is clearly greater than the nominal operating temperature of the accumulator and less than the critical runaway temperature of the core; i.e. a threshold temperature comprised between approximately 130° C. and approximately 150° C.

The gas generator 20 is a sealed capsule before activation, i.e. without contact with the electrolyte or the active material of the electrodes of the accumulator while the temperature does not exceed the predetermined threshold value. Thus, unlike the explosive agent described in the document WO-A-2004/049494, the reactive powder of the gas generator according to the invention does not risk interfering with the operation of the accumulator due to instability of the powder at certain operating potentials. The gas generator 20 is illustrated in the form of a cylindrical tube, preferably made of a material having good thermal conductivity such as copper for example; the tube is closed at both ends and contains a reactive element the ignition of which can be triggered by exceeding a temperature threshold value. The gas generator 20 has relatively small dimensions; it can be inserted in the container 2 of the accumulator without substantial modification of the arrangement of the electrochemical bundle 9. For example, for a cylindrical accumulator as illustrated in the FIGURE and having dimensions of 220 mm in height to a diameter of 54 mm, the tube of the gas generator 20 can have a length of 26 mm for an external diameter of 5 mm and an internal diameter of 4.4 mm. It is however understood that any shape other than a cylinder can be chosen for the gas generator of the safety device according to the invention, for example a pellet or cartridge or other shape.

The gas generator 20 can be positioned close to the negative current output terminal 7 in order to rapidly pick up a rise in temperature in the container 2. In fact, the negative current terminal is typically made of copper and it is rapidly heated by the passage of high currents during a short circuit. It is also possible to provide a thermally conductive element 25 which connects the gas generator 20 to the negative current terminal 7. According to the embodiment illustrated, the thermally conductive element 25 can be constituted by the flat connection 12 which connects the negative electrode of the bundle to the negative current output terminal 7; this flat connection 12, which is typically made of copper, can be shaped so as to encircle the tube of the gas generator 20. A compact and effective safety device is thus obtained.

The operation of the safety device is now described.

In case of a malfunction of the accumulator, the temperature in the environment of the gas generator 20 increases, either due to a short circuit, or due to too high an external temperature. During a short circuit a high current is generated which in particular heats the negative current output terminal 7. The temperature of the tube of the gas generator 20 then increases, all the more rapidly when a thermally conductive element 25 connects the negative current output terminal 7 to the tube of the gas generator.

When the temperature in the gas generator exceeds a predetermined threshold value, typically greater than 130° C.-150° C., for a duration which exceeds a given threshold value, typically 10 to 15 seconds, the powder contained in the tube reacts and the gas generator releases a given volume of gas. This reaction then causes an excess pressure in the container 2 which leads to the actuation of the circuit breaker 13. The quantity of reactive powder in the gas generator 20 can be chosen in order to create a pressure in the container 2 comprised between 4 to 20 bar, preferably between 8 to 12 bar. The thickness of the thinning 13 is chosen in order to be torn under the effect of such a pressure. The non-deformed part of the base 3 can form an angle 15 preventing the ejection of the electrochemical bundle during the tearing of the thinning. The excess pressure is then evacuated by the tearing and the pressure inside the accumulator returns to atmospheric pressure. Simultaneously with the appearance of the tearing, the electrical conduction between the flat connection of the positive electrode 11 and the wall of the container 2 is cut, interrupting the supply to electricity consumers.

The triggering of the safety device is rapid, less than 20 seconds, and occurs for temperature values well beyond the nominal operating values of the accumulator (typically 140° C.) Such a temperature in the accumulator could cause the runaway of the core, but this temperature is located at the negative current terminal (connected to the gas generator tube by a thermally conductive element). As the reaction of the gas generator is rapid (typically less than 15 seconds), the accumulator does not have the time to heat up. Any violent reaction is thus avoided. The actuation of the circuit breaker is caused by the activation of the gas generator and not by the electrolyte vapours. The safety device according to the invention thus avoids any emanations of harmful vapours.

When the circuit breaker is constituted by a thinning of a wall of the container, the safety device also has the advantage of not reducing the current density circulating in the electric circuit as is the case for the use of circuit breakers mounted in series. In fact, the chosen thickness of the thinning is a compromise between the largest possible section for ensuring the passage of current and the smallest possible section for allowing tearing of the thinning.

The safety device is therefore very suitable for high-power applications (hybrid vehicles for example), in which high current densities are utilized.

The embodiment described in detail above and the FIGURE must be considered as having been presented by way of a non-restrictive illustration; the invention is not supposed to be limited to the details provided here but can be modified without exceeding the scope of the attached claims. In particular, the circuit breaker can be inside the container or be formed on a wall other than the base of the container.

The invention claimed is:

1. Safety device for a sealed electrochemical accumulator (1) comprising:
    a circuit breaker (13) actuated by an excess pressure inside a container (2) of the accumulator;
    a gas generator (20) activated when the temperature in the generator exceeds a predetermined threshold value and in which the gas generator (20) before activation is a sealed capsule which contains a reactive powder.

2. Safety device according to claim 1, in which a predefined quantity of gas is released by the gas generator (20) when the temperature in the generator exceeds a predetermined temperature threshold value for a period greater than a predetermined duration threshold value.

3. Safety device according to claim 1, in which the temperature threshold value is comprised between 130° C. and 150° C.

4. Safety device according to claim 2, in which the duration threshold value is comprised between 10 and 20 seconds.

5. Safety device according to claim 1, in which the circuit breaker is constituted by a thinning (13) provided on a wall (3) of the container (2) of the accumulator, said thinning (13) being capable of being torn by an excess pressure inside the container.

6. Safety device according to claim 1, in which the activation of the gas generator (20) leads to a pressure inside the container (2) greater than or equal to 8 bar.

7. Safety device according to claim 1, in which the gas generator (20) is of cylindrical format.

8. Sealed accumulator comprising:
    a container (2) receiving alternating positive and negative electrodes respectively connected to positive (6) and negative (7) current output terminals, and
    a safety device according to claim 1 arranged in the container.

9. Accumulator according to claim 8, comprising a thermally conductive element (25) connecting the gas generator (20) to the negative current output terminal (7) of the accumulator.

10. Safety device according to claim 9, in which the thermally conductive element (25) is constituted by a flat connection (12) linking the negative electrode of the electrochemical bundle of the accumulator to the negative current output terminal (7).

* * * * *